(12) United States Patent
Yamano et al.

(10) Patent No.: US 7,406,119 B2
(45) Date of Patent: *Jul. 29, 2008

(54) METHOD AND APPARATUS FOR REDUCING SIGNAL PROCESSING REQUIREMENTS FOR TRANSMITTING PACKET-BASED DATA

(75) Inventors: Larry C. Yamano, Sunnyvale, CA (US); John T. Holloway, Woodside, CA (US); Edward H. Frank, Portola Valley, CA (US); Tracy D. Mallory, Palo Alto, CA (US); Alan G. Corry, Santa Clara, CA (US); Craig S. Forrest, San Francisco, CA (US); Kevin H. Peterson, San Francisco, CA (US); Timothy B. Robinson, Boulder Creek, CA (US); Dane Snow, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 636 days.

This patent is subject to a terminal disclaimer.

(21) Appl. No.: 10/202,254

(22) Filed: Jul. 24, 2002

(65) Prior Publication Data

US 2002/0181571 A1 Dec. 5, 2002

Related U.S. Application Data

(63) Continuation of application No. 09/472,764, filed on Dec. 27, 1999, now Pat. No. 6,445,731, which is a continuation of application No. 08/853,683, filed on May 9, 1997, now Pat. No. 6,075,814.

(51) Int. Cl.
*H04B 1/38* (2006.01)
*H04K 1/10* (2006.01)

(52) U.S. Cl. .................................. 375/222; 375/260

(58) Field of Classification Search ................. 375/222, 375/223, 260; 370/311, 318; 455/343, 557, 455/574, 83, 522
See application file for complete search history.

(56) References Cited

U.S. PATENT DOCUMENTS 4,234,952 A 11/1980 Gable et al.

(Continued)

FOREIGN PATENT DOCUMENTS

| WO | WO86/03642 | 6/1986 |
| WO | WO91/07038 | 5/1991 |

OTHER PUBLICATIONS

Robyn Aber, "xDSL Supercharges Copper. DSL schemes promise multimegabit rates over local phone lines-and carriers and vendors are nearly ready to deliver," *Data Communications*, Mar. 1997, pp. 99/100, 102, 104/105, vol. 26, No. 3. (XP000659545).

(Continued)

*Primary Examiner*—Don N. Vo

(57) ABSTRACT

A receiver circuit of the modem is coupled to receive a continuous analog signal from a communication channel. This analog signal includes both packet and idle information. A burst mode protocol is also provided, in which packets of digital information are modulated by a transmitter circuit of the modem, thereby converting the packets of digital information into analog signal bursts of discrete duration. These analog signal bursts are transmitted from the transmitter circuit to a telephone line. A receiver circuit monitors the telephone line to detect the analog signal bursts. Upon detecting the presence of the analog signal bursts on the telephone line, the receiver circuit demodulates the analog signal bursts using full processing capabilities of the receiver circuit. However, upon detecting the absence of the analog signal bursts on the telephone line, the demodulating function of the receiver circuit is disabled. The burst mode protocol enables multidrop and multi-cast operation, as well as reducing required DSP resources.

15 Claims, 9 Drawing Sheets

U.S. PATENT DOCUMENTS

| | | | |
|---|---|---|---|
| 4,680,773 A | | 7/1987 | Amundson |
| 4,691,314 A | | 9/1987 | Bergins et al. |
| 4,756,007 A | | 7/1988 | Qureshi et al. |
| 4,856,030 A | | 8/1989 | Batzer et al. |
| 4,868,850 A | | 9/1989 | Kaku et al. |
| 5,144,296 A | * | 9/1992 | DeLuca et al. ............. 340/7.35 |
| 5,463,661 A | | 10/1995 | Moran, III et al. |
| 5,491,721 A | | 2/1996 | Cornelius et al. |
| 5,544,082 A | | 8/1996 | Garcia-duarte et al. |
| 5,625,651 A | | 4/1997 | Cioffi |
| 5,636,209 A | | 6/1997 | Perlman |
| 5,745,860 A | | 4/1998 | Kallin |
| 5,805,990 A | * | 9/1998 | Ohki ....................... 455/343.5 |
| 5,838,720 A | * | 11/1998 | Morelli ....................... 375/219 |
| 5,844,938 A | * | 12/1998 | Hupp et al. ................. 375/217 |
| 5,862,136 A | | 1/1999 | Irwin |
| 5,920,834 A | * | 7/1999 | Sih et al. .................... 704/233 |
| 5,978,366 A | * | 11/1999 | Massingill et al. .......... 370/337 |
| 5,991,301 A | * | 11/1999 | Christie .................. 370/395.3 |
| 6,028,860 A | | 2/2000 | Laubach et al. |
| 6,085,072 A | * | 7/2000 | Komiya ....................... 455/83 |
| 6,978,149 B1 | * | 12/2005 | Morelli et al. .............. 455/522 |

OTHER PUBLICATIONS

A.M. Alvarez et al., "Data-Pump Implemental for Automatic Interworking Between Automode Models and Other CCITT & Bell Modems," *Signal Processing Theories and Applications, Proceedings of EUSIPCO-92, Sixth European Signal Processing Conference Brussells, Belgium*, Aug. 24-27, 1992, pp. 1645-1648, vol. 3, Elsevier. (XP000356561).

Dr. Frank Gao, "DSP Algorithms and Software for Modem, Fax, and Telephony," *Electronic Design*, May 28, 1996, pp. 123/124, 126, vol. 44, No. 11. (XP000623737).

"Digital Signal Processor Modem for Multiple Telephone Lines," *IBM Technical Disclosure Bulletin*, Apr. 1996, pp. 263/264, vol. 39, No. 4. (XP000587492).

* cited by examiner

METHOD AND APPARATUS FOR REDUCING SIGNAL PROCESSING REQUIREMENTS FOR TRANSMITTING PACKET-BASED DATA

CROSS-REFERENCE TO RELATED APPLICATIONS

The present application is a continuation of U.S. patent application Ser. No. 09/472,764 filed Dec. 27, 1999 now U.S. Pat. No. 6,445,731 which is a continuation of U.S. patent application Ser. No. 08/853,683 filed May 9, 1997, now U.S. Pat. No. 6,075,814.

BACKGROUND OF THE INVENTION

1. Field of the Invention

The present invention relates to the reduction of the required amount of signal processing in a modulator/demodulator (modem) which is transferring packet-based data or other information which is intermittent in nature on a communication channel.

2. Related Art

Modern data networks commonly use complex digital signal processing (DSP) devices called modems to transport data over communication channels. Data is typically transported via an analog transmission signal which is representative of a synchronous, constant rate bit stream. This form of communication channel is suitable for the transmission of real-time information such as voice or video. However, it is increasingly common to use modems for the transmission of packet-based information. For example, packet-based information is used to access the Internet and the World Wide Web. However, packet-based information is typically bursty in nature, with an average data rate which is often much less than the available peak data transfer rate of the communication channel.

FIG. 1 is a block diagram of a transmitter circuit 100 of a conventional modem. Transmitter circuit 100 includes packet queue 101, framer 102, channel coding circuit 103, output shaper 104, modulator 105 and digital-to-analog (D/A) converter 106. In accordance with conventional modem protocols, transmitter circuit 100 transforms source data received by packet queue 101 into a continuous time analog transmit signal, which is provided at the output terminal of D/A converter 106.

More specifically, within transmitter circuit 100, the source data is grouped into packets and stored in packet queue 101. These packets are not synchronous with respect to the modem bit clock, but arrive at packet queue 101 at random times. Framer 102 receives the packets from packet queue 101, and in response, composes a continuous bit stream which is synchronous with respect to the modem bit clock. To create such a synchronous bit stream in response to the asynchronous packets, framer 102 generates idle information (i.e., nulls or a marking tone) when no packets are available, and generates packet data when packets are available. The packet data and idle information are delineated in such a way that a receiver circuit of a modem (see, e.g., FIG. 2) can determine where the packet boundaries lie.

The synchronous bit stream generated by framer 102 is then coded by channel coding circuit 103. Channel coding circuit 103 is used to compensate for noise and distortion in the communication channel. Channel coding circuit 103 provides redundant information (e.g., convolutional encoding) to allow for error correction. Channel coding circuit 103 further performs a scrambling function, as well as mapping the coded bit stream onto symbol values. The stream of symbol values generated by channel coding circuit 103 is provided to output shaper 104.

Output shaper 104 digitally filters the stream of symbol values received from channel coding circuit 103. Output shaper circuit 104 limits the frequency bandwidth of these symbol values within a predetermined range and may also be adjusted to help compensate for channel distortion. The filtered sample stream provided by output shaper 104 is provided to modulator 105, which modulates a carrier signal by the filtered sample stream. The output of modulator 105 is provided to D/A converter 106, which generates an analog TRANSMIT signal for transmission on the communication channel (i.e., telephone line).

Transmitter circuit 100 exhibits three distinct disadvantages. First, because transmitter circuit 100 transmits constantly (either packet data or idle information), a modem can be functionally connected to only one telephone line at any given time. Moreover, only a small percentage of the total information carrying capacity of the communication channel is used to transmit data, while a large percentage of this capacity is used to transmit idle information. Additionally, transmitter circuit 100 is unsuited to multi-drop operation on a single communication channel. The first disadvantage mentioned above is particularly deleterious where a number of xDSL modems are collected together in a central office to provide data communications to a number of remote locations. In this case, each remote location requires a dedicated xDSL modem in the central office.

The analog TRANSMIT signal is transmitted over the telephone line to the telephone company central office. Within the central office, an analog to digital converter converts the analog TRANSMIT signal into a digital signal. This digital signal is multiplexed onto a digital backbone circuit and routed to a second central office location. The digital signal is demultiplexed within the second central office location and routed over a digital trunk to a digital server which performs additional processing on the digital signal.

FIG. 2 is a block diagram of a receiver circuit 200 of a conventional modem. Receiver circuit 200 includes analog-to-digital (A/D) converter 201, resampler 202, equalizer 203, carrier recovery circuit 204, symbol decision circuit 205, channel decoding circuit 206, framer 207, packet queue 208, echo canceler 209, timing update circuit 210, equalizer update circuit 211 and carrier update circuit 212. Carrier recovery circuit 204 and symbol decision circuit 205 are sometimes referred to as a demodulator circuit. A/D converter 201 is coupled to the telephone line to receive the analog signal from the telephone company central office. A/D converter 201 samples this analog signal, thereby converting the analog signal into a digital signal.

The modem which includes receiver circuit 200 also includes a transmitter circuit (i.e., a near end transmitter circuit, not shown) which is similar to transmitter circuit 100. During full duplex operation, this near end transmitter circuit may be generating a TRANSMIT signal at the same time that receiver circuit 200 is attempting to receive the analog signal from the remote (or far end) transmitter circuit 100. Under these conditions, receiver circuit 200 may receive an echo of the TRANSMIT signal. Echo canceler 209 generates a signal which is a replica of this echo. The signal generated by echo canceler 209 is then subtracted from the output signal provided by A/D converter 201.

Resampler 202 adjusts the raw input samples received from A/D converter 201 to match the symbol rate of the transmitter circuit 100. Timing update circuit 211 extracts timing information which is used to control resampler 202.

Equalizer 203 compensates for linear distortions introduced by the communication channel (e.g., the telephone line). Carrier recovery circuit 204 extracts the carrier signal from the received signal and provides rough symbols (or a soft symbol decision) to symbol decision circuit 205. Symbol decision circuit 205 quantizes the rough symbols and makes hard decisions as to the identity of the received symbols. Equalizer update circuit 211 and carrier update circuit 212 receive the symbols provided by symbol decision circuit 205. In response, equalizer update circuit 211 and carrier update circuit 212 determine quantizer error. In response to this quantizer error, equalizer update circuit 211 and carrier update circuit 212 adjust the coefficients used by equalizer 203 and carrier recovery circuit 204, respectively, thereby improving the accuracy of subsequent hard symbol decisions.

Channel decoding circuit 206 uses redundant information present in the received analog signal to correct for quantizer errors. Channel decoding circuit 206 typically implements a maximum likelihood sequence estimator (MLSE) circuit (such as a Viterbi decoder or other form of error correction. Channel decoding circuit 206 provides a decoded bit stream to framer 207. Finally, framer 207 decodes the bit stream into packet data, discarding the idle information, and loading the packets of data into packet queue 208.

The operation of receiver circuit 200 is significantly more complex than the operation of transmitter circuit 100. Substantial signal processing is performed by receiver circuit 200, typically many hundreds or thousands of operations per symbol processed. Much of the signal processing is concentrated in equalizer 203, echo canceler 209, and channel decoding circuit 206. A significant percentage of this signal processing is dedicated to the processing of the idle information generated by transmitter circuit 100.

It would therefore be desirable to have a modem system which is capable of utilizing a greater percentage of the information carrying capacity of the telephone line to transfer packet based data. It would also be desirable to have a modem system which minimizes the signal processing which must be dedicated to the processing of idle symbols. It would further be desirable to have a modem system which enables a common modem to be functionally connected to a plurality of telephone lines at the same time. It would further be desirable to have a modem system which enables a common telephone line to be used with a plurality of modems in a multi-drop configuration.

SUMMARY

Accordingly, the present invention provides a method for operating a modem on a communication channel which includes the following steps. A receiver circuit of the modem is coupled to receive a continuous analog signal which is transmitted on the communication channel. This continuous analog signal includes both packet information and idle information. The receiver circuit monitors the analog signal to detect the presence of the idle information. Upon detecting the presence of the idle information, the receiver enters a standby mode. In the standby mode, the amount of processing performed by the receiver circuit is reduced.

The reduction of the amount of processing performed by the receiver circuit can be achieved by disabling and/or reducing the processing precision of selected elements within the receiver circuit. For example, a symbol decision circuit, a channel decoder and a framer within the receiver circuit can be disabled during the standby mode in one embodiment of the invention. Moreover, the processing precision of other elements, such as an echo canceler, update circuits and an equalizer can be reduced when the receiver circuit is in the standby mode.

To detect the presence of the idle information, the receiver circuit fully demodulates the analog signal to provide a digital bit stream. This digital bit stream is processed by the receiver circuit to determine when packet data ceases to be transmitted on the communication channel, and the transmission of idle information commences. At some point after the receiver circuit detects the start of the idle information, the receiver circuit enters the standby mode. At this time, various elements within the receiver circuit are disabled and/or operated with reduced precision. In addition, an idle bit pattern, which is synchronous with the idle bit pattern generated by the associated transmitter circuit, is converted to a plurality of expected idle symbols. The expected idle symbols are then compared with a plurality of soft symbols which are generated by the receiver circuit in response to the analog signal using reduced processing within the receiver circuit. The receiver circuit remains in the standby mode as long as the expected idle symbols match the soft symbols.

The receiver circuit can further store a most recent history of the analog signal in a buffer. After the standby mode is exited, this buffer can be accessed, thereby enabling the receiver circuit to re-process the most recent history of the analog signal. This helps ensure that no packet information is lost due to the inherent delay in detecting the presence of packet information.

In accordance with another aspect of the present invention, the receiver circuit can monitor the quality of the analog signal on the communication channel and reduce the amount of processing performed by the receiver circuit if the channel quality exceeds a predetermined level. This further reduces the processing requirements of the receiver circuit.

In accordance with another embodiment of the invention, a burst mode protocol is provided for operating a modem on a telephone line. The burst mode protocol involves modulating packets of digital information by a transmitter circuit of the modem, wherein the packets of digital information are converted into analog signal bursts of discrete duration. These analog signal bursts are transmitted from the transmitter circuit to the telephone line. However, no signal is provided from the transmitter circuit to the telephone line between the analog signal bursts. In one embodiment, a non-idle state signal is appended to the beginning of the analog signal bursts by the transmitter circuit, thereby signalling the presence of the analog signal bursts.

A receiver circuit of the modem monitors the telephone line to detect the presence and absence of the analog signal bursts. This monitoring step is performed by a non-idle detector within the receiver circuit. When the non-idle detector detects the presence of the analog signal bursts on the telephone line, the non-idle detector causes the receiver circuit to demodulate the analog signal bursts using full processing capabilities of the receiver circuit. However, when the non-idle detector detects the absence of the analog signal bursts on the telephone line, the non-idle detector disables the demodulating function of the receiver circuit. This greatly reduces the processing requirements of the receiver circuit when there are no analog signal bursts present on the telephone line.

In one embodiment, the non-idle detector determines the presence and absence of the analog signal bursts on the telephone line by monitoring the telephone line for the presence and absence of carrier energy. Alternatively, the non-idle detector can monitor the telephone line for the presence and absence of a non-idle state signal provided by the transmitter circuit.

In accordance with the burst mode protocol, there are certain periods during which the transmitter circuit is not transmitting any signals. During these periods, the echo canceler of the associated local receiver circuit can be disabled, since there will be no echo signal to cancel during these periods. This further reduces the processing requirements of the receiver circuit.

In accordance with another aspect of the present invention, the receiver circuit can monitor the quality of the analog signal bursts on the telephone line and reduce the amount of processing performed by the receiver circuit if the line quality exceeds a predetermined level. This further reduces the processing requirements of the receiver circuit.

In accordance with another embodiment of the present invention, a plurality of remote transmitter circuits, which are coupled to separate telephone lines, generate analog signal bursts in accordance with the burst mode protocol. The separate telephone lines are connected together at a central location where the analog signal bursts are multiplexed to a number of receiver circuits. A non-idle detector is coupled to receive the analog signal bursts from each of the transmitter circuits, and to detect the presence and absence of the analog signal bursts on the telephone lines. Typically, only a small number of the telephone lines will be transmitting analog signal bursts at any given time. The analog signal bursts are therefore multiplexed into a number of receiver circuits which is less than the number of telephone lines. That is, each receiver circuit can process analog signal bursts from a plurality of telephone lines. As a result, the number of receiver circuits required to handle information from a given number of telephone lines is advantageously reduced. In a particular embodiment, different sets of update coefficients are enabled within the receiver circuits, depending upon which telephone line is currently coupled to the receiver circuit.

The present invention also includes a method for operating a plurality of modems on a single telephone line (i.e., multi-drop operation). This method includes the steps of (1) modulating packets of digital information by the modems, wherein the packets of digital information are converted into analog signal bursts of discrete duration, (2) transmitting the analog signal bursts from the modems to the telephone line, (3) providing no signal from the modems to the telephone line between the analog signal bursts, and (4) arbitrating the transmitting of the analog signal bursts from the modems to the telephone line such that only one modem is transmitting analog signal bursts to the telephone line at any given time.

In one variation of the multi-drop method, each of the analog signal bursts includes a preamble and a corresponding main body. Each preamble is transmitted in accordance with a predetermined first modem protocol. However, the main bodies can be transmitted in accordance with different modem protocols which are different than the first modem protocol. For example, the different modem protocols may implement different data rates, modulation formats and/or protocol versions. The modem protocol associated with each of the main bodies is identified by information included in the corresponding preamble. This variation enables devices having different operating capabilities (e.g., personal computers and smart appliances) to be operably coupled to the same telephone line in a multi-drop configuration.

The present invention further includes a method for implementing a multi-line network access circuit. In this embodiment, digital data packets are transmitted from a plurality of sources (e.g., ISPs) to a multi-line network access circuit. The digital data packets do not include idle information. The multi-line network access circuit identifies the telephone lines associated with the digital data packets using a destination address monitor. Digital data packets from different sources are multiplexed to a common digital signal processing (DSP) resource. This common DSP resource modulates digital data packets from different sources. The multi-line network access circuit then de-multiplexes the modulated digital data packets onto telephone lines corresponding to the destination addresses. In one variation, a common idle generator within the multi-line network access circuit is used to generate common idle information for each of the telephone lines. In another variation, a non-idle state signal generator within the multi-line network access circuit is used to generate non-idle state signalling for each of the telephone lines.

Yet another embodiment of the present invention provides a method of implementing a multi-cast network access circuit. In accordance with this method, a digital data packet is transmitted from a source to the multi-cast network access circuit. In this embodiment, the digital data packet does not include idle information. The digital data packet identifies a plurality of destination addresses to which the digital data packet is to be transmitted. The digital data packet is routed to a digital processing resource and modulated. The modulated digital data packet is demultiplexed to a plurality of telephone lines which correspond to the destination addresses, thereby completing the multi-cast operation.

The present invention will be more fully understood in view of the following detailed description taken together with the drawings.

DETAILED DESCRIPTION

Figure 3:
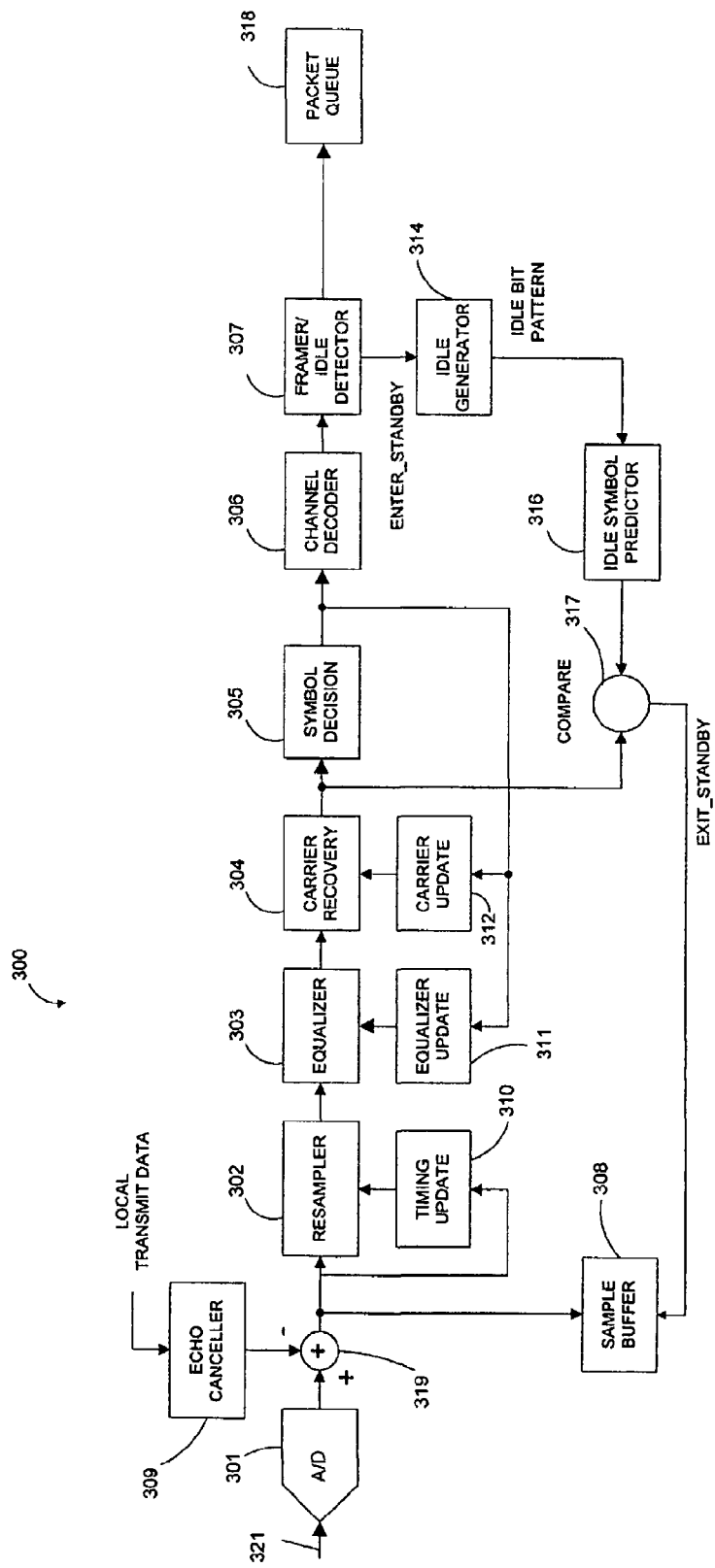
FIG. 3 is a block diagram of a receiver circuit of a modem in accordance with one embodiment of the invention.

FIG. 3 is a block diagram of a receiver circuit 300 of a modem in accordance with one embodiment of the present invention. Receiver circuit 300 includes A/D converter 301, resampler 302, equalizer 303, carrier recovery circuit 304, symbol decision circuit 305, channel decoder 306, framer/idle detector 307, sample buffer 308, echo canceler 309, timing update circuit 310, equalizer update circuit 311, carrier update circuit 312, idle generator 314, idle symbol predictor 316, comparator circuit 317, packet queue 318 and summing node 319. In combination, carrier recovery circuit 304 and symbol decision circuit 305 form a demodulator. In the described embodiment, A/D converter 301 is implemented by a coder/decoder (codec) chip, while the remaining elements of receiver circuit 300 are implemented by a digital signal processor (DSP). In other embodiments, the elements of receiver circuit 300 can be implemented by other means, such as a general purpose processor. Receiver circuit 300 is coupled to receive an analog RECEIVE signal from communication channel 321, which in the described embodiment, is a telephone line. It is understood that other communication channels, such as twisted pair other than a telephone line, wireless, coaxial cable, infrared or optical, can be used in other embodiments.

In the described embodiment, the RECEIVE signal received on communication channel 321 is an analog signal in accordance with a conventional modem protocol, such as xDSL or a voice band modem protocol. For example, this analog RECEIVE signal could originate from transmitter circuit 100 (FIG. 1) in the manner previously described. Thus, the analog RECEIVE signal received on communication channel 321 includes modulated packet data as well as idle information which is interleaved with the packet data.

A/D converter 301 samples the analog RECEIVE signal, thereby converting the analog RECEIVE signal into a digital signal. This digital signal is provided to a positive input terminal of summing node 319. Echo canceler 309 uses the local transmit signal to adaptively predict the echo signal on communication channel 321. As previously described, an echo of the local transmit signal may be present if the modem which includes receiver circuit 300 is operating in full duplex mode. Echo canceler 309 applies the predicted echo signal to the negative input terminal of summing node 319, thereby canceling the echo signal from the digital signal.

The digital signal output by summing node 319 is provided to a conventional resampler 302. Resampler 302 interpolates this digital signal to generate samples which match the symbol rate of the transmitter circuit. Timing update circuit 310 monitors the digital signal provided by summing node 319. Timing update circuit 310 is a conventional element which runs a control loop to extract symbol timing information from this digital signal. This symbol timing information is provided to resampler 302, thereby enabling resampler 302 to control the sampling process as necessary.

The digital signal output by summing node 319 is further provided to sample buffer 308. Sample buffer 308 is a dual-port first-in, first-out (FIFO) circular buffer which stores a most recent history of the digital signal provided by summing node 319. In the described embodiment, the information stored in sample buffer 308 is representative of a plurality N of the most recent symbols. In one embodiment, N is equal to eight, although N can be any integer value. In other embodiments N is much larger, having a magnitude on the order of hundreds or even thousands. The operation of sample buffer 308 is described in more detail below.

The raw input samples are routed from resampler 302 to adaptive equalizer 303. Adaptive equalizer 303 is a conventional element which modifies the raw input samples to compensate for linear distortions introduced by communication channel 321. To accomplish this, equalizer 303 processes the raw input samples using a plurality of equalization coefficients which are updated periodically within equalizer update circuit 311 based on quantization errors measured at the output of the symbol decision circuit 305.

Equalizer 303 provides a stream of equalized digital samples to carrier recovery circuit 304. Carrier recovery circuit 304 is a conventional element which extracts the carrier signal from the equalized digital samples and, for each digital sample, provides a soft decision (i.e., a best estimate) concerning the identity of the corresponding symbol. The symbols achieved by the soft decision are hereinafter referred to as soft symbols. The soft symbols are transmitted to symbol decision circuit 305.

Symbol decision circuit 305 is a conventional circuit which quantizes the soft symbols provided by carrier recovery circuit 304, thereby making a hard decision as to the identity of the received symbols. The symbols achieved by the hard decision are hereinafter referred to as hard symbols. The hard symbols are fed back to equalizer update circuit 311 and carrier update circuit 312. In response, equalizer update circuit 311 and carrier update circuit 312 determine quantizer error. In response to the quantizer error, equalizer update circuit 311 and carrier update circuit 312 adjust the processing coefficients used by equalizer 303 and carrier recovery circuit 304, respectively, thereby improving the accuracy of the hard decisions made by symbol decision circuit 305.

The hard symbols generated by symbol decision circuit 305 are also provided to conventional channel decoding circuit 306. Channel decoding circuit 306 uses redundant information in present in the RECEIVE signal to correct for quantizer errors. Channel decoding circuit 306 typically implements a maximum likelihood sequence estimator (MLSE) circuit such as a Viterbi decoder or some other form of error correction. Channel decoding circuit 306 provides a decoded bit stream to framer/idle detector 307.

Framer/idle detector 307 monitors the digital bit stream to determine if the digital bit stream is representative of an idle bit pattern. When the digital bit stream is representative of an idle bit pattern, the digital bit stream is said to represent an IDLE state. When the digital bit stream is not representative of an idle bit pattern (i.e., the digital bit stream is representative of packet data), the digital bit stream is said to represent a DATA state. To decrease the chance of falsely detecting the presence of an idle bit pattern, the determination can be postponed until several successive symbols of the idle bit pattern have been detected by framer/idle detector 307.

If framer/idle detector 307 detects that the digital bit stream is representative of packet data (i.e., a DATA state exists), then framer/idle detector 307 de-asserts a control signal (ENTER_STANDBY) to disable idle generator circuit 314. Framer/idle detector 307 also generates a digital bit stream which is representative of the received packet data. This digital bit stream is provided to packet queue 318 for further processing. Framer/idle detector 307 is a conventional circuit element well known to those of ordinary skill in the art.

If framer/idle detector 307 determines that the digital bit stream provided by channel decoding circuit 306 is representative of an idle bit pattern (i.e., an IDLE state exists), then receiver circuit 200 enters a standby mode in the following manner. Framer/idle detector 307 does not provide any output bit stream to packet queue 318. Framer/idle detector 307 asserts the ENTER_STANDBY signal which enables idle generator circuit 314. In response, idle generator circuit 314 generates an idle bit pattern as defined by the applicable modem protocol. This idle bit pattern is synchronous with the pattern that receiver circuit 300 expects to receive from the corresponding transmitter circuit.

The idle bit pattern generated by idle generator circuit 314 is also provided to idle symbol predictor circuit 316. In response to the idle bit pattern, idle symbol predictor 316 generates a sequence of expected idle symbols in accordance with the applicable modem protocol. Thus, the idle bit pattern is converted into a stream of expected idle symbols. Alternatively, where the stream of expected idle symbols repeats with a reasonable period, the stream of expected idle symbols can be pre-computed and stored in a table within receiver circuit 300, and accessed when framer/idle detector 307 detects an idle bit pattern.

The sequence of expected idle symbols is provided to a first input terminal of comparator circuit 317. The second input terminal of comparator circuit 317 is coupled to carrier recovery circuit 304, such that the soft symbols generated by carrier recovery circuit 304 are provided to the second input terminal of comparator circuit 317. Comparator circuit 317 compares the expected idle symbols received from idle symbol predictor circuit 316 with the soft symbols received from carrier recovery circuit 304. If comparator circuit 317 detects a match, comparator circuit 317 allows processing to continue in standby mode by de-asserting a control signal EXIT_STANDBY. The de-asserted EXIT_STANDBY signal causes receiver circuit 300 to remain in the standby mode. In this manner, the soft symbols provided by carrier recovery circuit 304 are used make the determination as to whether the RECEIVE signal is representative of an IDLE state.

Because the soft symbols are used to determine whether the RECEIVE signal is representative of an IDLE state, the following elements of receiver circuit 300 can be disabled during the standby mode: symbol decision circuit 305, channel decoder 306, framer/idle detector 307, equalizer update circuit 311 and carrier update circuit 312. As a result, the processing requirements of receiver circuit 300 are greatly reduced when receiver circuit 300 operates in the standby mode. In the described embodiment, the symbol decision circuit 305, channel decoder 306, framer/idle detector 307, equalizer update circuit 311 and carrier update circuit 312 are disabled in response to the asserted ENTER_STANDBY control signal, and are enabled in response to the asserted EXIT_STANDBY control signal. To further reduce the processing requirements of receiver circuit 300 during the standby mode, equalizer 303, carrier recovery circuit 304, timing update circuit 310 and echo canceler 309 can be operated in a reduced precision processing mode while receiver circuit 300 is operating in the standby mode. Even further reductions are possible by applying well understood sequence estimation concepts. That is, the quality of processing required to make the soft decision can be greatly relaxed during standby mode.

More specifically, the length of echo canceler 309 can be significantly reduced during standby mode because the resulting uncompensated error will be compensated for by the vastly increased window of comparison implemented by comparator circuit 317. In addition, the frequency of updates within echo canceler 309 can also be reduced. The length of echo canceler 309 can also be reduced since distant echos may now be small enough to be ignored. Similarly, the tolerance requirements for timing update circuit 310 can be greatly relaxed and the length of resampler 302 can be shortened. In many cases, equalizer 303 can be disabled during standby mode. In most other cases, equalizer 303 can be implemented with just a few taps of a FIR filter during standby mode. If the carrier signal is locked to the timing, then the carrier tracking performed by carrier recovery circuit 304 may not be necessary if the target C/I ratio is reduced to approximately 12 dB to provide an acceptable level of phase jitter. If carrier recovery circuit 304 includes a phase locked loop (PLL) to track a center frequency of the signal provided by equalizer 303, then the update rate of the PLL may be reduced.

An example of the reduced processing implemented during the standby mode is described in more detail below. The full and reduced precision processing modes of equalizer 303, carrier recovery circuit 304 and echo canceler 309 can be entered and exited in response to the ENTER_STANDBY and EXIT_STANDBY control signals.

When comparator 317 determines that a soft symbol provided by carrier recovery circuit 304 does not correspond with an expected idle symbol provided by the idle symbol predictor circuit 316, comparator 317 asserts the EXIT_STANDBY signal. The asserted EXIT_STANDBY signal is also used to cause receiver circuit 300 to exit the standby mode. Upon exiting the standby mode, symbol decision circuit 305, channel decoder 306, framer/idle detector 307, equalizer update circuit 311 and carrier update circuit 312 are enabled. In addition, equalizer 303, carrier recovery circuit 304 and echo canceler 309 are returned to their full processing capabilities.

The asserted EXIT_STANDBY signal also causes the most recent history of the digital signal stored in sample buffer 308 to be provided to resampler 302. In the described example, sample buffer 308 initially provides the symbol which was received N symbols before the soft symbol which failed to match the expected idle symbol. Processing then proceeds forward from this previous sample. By reprocessing the most recent history of the digital signal, the probability that useful data is thrown away because of failure to detect the end of the IDLE state is minimized. Moreover, reprocessing the most recent history of the digital signal enables the timing, carrier and equalization update circuits to be restored to the accuracies necessary to operate at the agreed upon transmission rate.

In the foregoing example, receiver circuit 300 must process N symbols of the most recent history of the digital signal two times, once at reduced processing capability and once at full processing capability. However, this re-processing enables many (typically thousands) of idle symbols to be processed at a reduced processing capability. The overall result is a large reduction in the overall processing requirements.

In the foregoing manner, receiver circuit 300 is only required to operate at full processing capability when the RECEIVE signal transmits symbols which are representative of data. In a packet based data transmission environment, this can greatly reduce the percentage of time during which receiver circuit 300 must operate at full processing capability. This reduced processing load on receiver circuit 300 can allow for other processing, such as non-communication processing, to be effected by the same processing resource used by receiver circuit 300, or can be used to reduce power consumption of the processing element. In another embodiment, the reduced processing load on receiver circuit 300 can enable a single processing resource to perform standby idle prediction and detection for multiple lines. In this embodiment, the single processing resource signals other processing resources to schedule for full demodulation processing when the received signal enters the DATA state.

One example of the reduced processing possible during standby mode will now be described. For example, consider a quadrature amplitude modulation (QAM) modem. Assume that all symbols have the same probability of being transmitted (although this assumption is not necessary to practice the present invention). Each of the symbols can be defined as having a particular location (or signal point) within a signal constellation The signal points are separated by predetermined distances within the signal constellation. In the present embodiment, the idle symbol predictor 316 determines the location of the next expected idle symbol. Idle symbol predictor 316 then defines a predicted region which laterally surrounds the location of this expected IDLE symbol. The predicted region has a radius, $R_{PREDICTED}$. If the soft symbol identified by carrier recovery circuit 304 lies within the predicted region, then this soft symbol will be deemed to have been the expected IDLE symbol. Note that once the transmission of useful data symbols resumes, there is still a chance that the initial data symbol will lie within the predicted region of the next expected IDLE symbol. However, if the entire signal constellation is considered, the probability of the initial data symbol lying within the predicted region of the expected idle symbols can be made small. As a result, the radius $R_{PREDICTED}$ can be made relatively large, while the chances of incorrectly remaining in the standby mode can be made relatively small.

For example, assume that "Area_predicted" is the area of the predicted region (i.e., the area of the region within $R_{PREDICTED}$ of the expected IDLE symbol), and that "Area_total" is the area of the entire signal constellation. Further assuming that for normal useful data transmission the received symbols would be distributed uniformly over Area_total, then the probability of missing the transition from an IDLE state to a DATA state is approximately:

$$P_1[\text{miss}] = \text{Area\_predicted}/\text{Area\_total}$$

However, the probability of N useful data symbols tracking N expected IDLE symbols (where N is an integer greater than one) is approximately:

$$P_N[\text{miss}] = (\text{Area\_predicted}/\text{Area\_total})^N$$

Using sample buffer 308 to maintain a recent history of N samples minimizes the likelihood of missing transitions from the IDLE state to the DATA state.

A specific example is provided below with hypothetical numbers. If Area_predicted/Area_total=¼ and a sequence of 8 symbols is considered (i.e., N=8), then, $$P_N[\text{miss}] = (1/4)^8 = 1.5 \times 10^{-5}$$

Furthermore, this ratio of Area_predicted/Area_total implies that the quality of processing need only be roughly equivalent to that of quadrature phase shift keying (QPSK).

If receiver circuit 300 fails to detect the transition from an IDLE state to a DATA state within N symbols, the initial data packet would be lost. However, the modem protocol, such as V.42, or a higher level modem protocol would merely request retransmission of the initial data packet. The end result is a brief degradation in data throughput. Most network protocols require that packets have a minimum size, increasing the likelihood of detection of the initial data packet.

The probability of falsely detecting that a DATA state exists (when an IDLE state actually exists) can be calculated as follows. First, assume a carrier to interference ratio (C/I) of 10.5 dB (with interference being defined as noise plus interference plus equalizer mismatch plus other forms of processing degradation, primarily resulting from reduced processing. Therefore, the probability of falsely detecting a DATA state is approximately $1 \times 10^{-3}$, based on error probability curves for QPSK modulation. The error probability curves for QPSK modulation can be used because QPSK modulation, like the described example, exhibits an Area_Predicted/Area_Total ratio of ¼. Because there is a relatively low probability of falsely detecting a DATA state, in one variation of the invention, a single detected data symbol causes receiver circuit 300 to transition to the DATA state.

Moreover, if a soft symbol which is actually representative of an expected idle symbol is erroneously determined to be located outside of the predicted region, then receiver circuit 300 merely exits the standby mode resumes more accurate processing of the RECEIVE signal. If the RECEIVE signal is indeed representative of an IDLE state, receiver circuit 300 subsequently detects the IDLE state and re-enters the standby mode. The end result is a brief degradation in computational efficiency.

In the present example, 99.9% (i.e., $1-(1 \times 10^{-3})$) of the IDLE state should be detectable. Furthermore, sequential estimation techniques across a set of samples can be used to further decrease the error in idle estimation, if necessary. The associated transmitter circuit can enhance detection of the DATA states by prefixing new packet transmissions with a preamble to trigger comparator 317.

It is estimated that the previously described optimizations provide an order of magnitude reduction in processing within receiver circuit 300 during the standby mode.

In another embodiment of the present invention, receiver circuit 300 is modified such that comparator 317 receives the equalized digital samples provided by equalizer circuit 303, rather than the soft symbols provided by carrier recovery circuit 304. In this embodiment, conventional differential processing can be performed on the equalized digital samples provided by equalizer circuit 303. This differential processing determines the actual differences between successive equalized digital samples. In this embodiment, idle symbol predictor 316 is modified to provide predicted differences between successive IDLE symbols (rather than predicted IDLE symbols). Comparator 317 then compares the actual differences provided by equalizer 303 with the predicted differences provided by idle symbol predictor 316 to determine whether the signal received on communication channel 321 is representative of an IDLE state or a DATA state.

The concept of idle detection and idle symbol prediction can be applied to other modulation types in addition to QAM. One example of an alternative modulation type is carrier-less amplitude and phase (CAP) modulation. Another example is pulse amplitude modulation (PAM). PAM can be geometrically viewed as a one dimensional constellation, where the 'areas' described for in QAM example convert to 'line lengths' in PAM.

For multi-carrier techniques such as discrete multi-tone modulation (DMT) (also known as orthogonal frequency division multiplexing, or OFDM), there is, as in the QAM example, a channel decoding stage out of which the IDLE state can be detected. Assuming that the remote transmitter circuit is a single channel and continues to transmit idle information, subsequent idle symbols at the receiver circuit can be predicted.

Once the IDLE state has been detected, a standby mode can be entered during which only one (or a small subset) of the multiple carriers is processed. If the output of this reduced processing matches properly with the expected continuation of the idle sequence, then the standby mode is maintained. Otherwise, the standby mode is exited and full processing is resumed from a point far enough back in the input sample buffer to guarantee correct demodulation of the onset of useful data.

In accordance with another embodiment of the invention, the quality of the communication channel 321 can be determined by monitoring various elements within receiver circuit 300. For example, error correction circuitry present in channel decoder 306 can be monitored to determine the quality of the established communication channel 321 (i.e., whether a large or small amount of error correction is being performed). Another measure of the signal quality is the mean of the square of the quantizer error (i.e., the difference between the input and the output of the symbol decision circuit 305). If the communication channel 321 is determined to be a high quality connection, then the processing within receiver circuit 300 can be reduced. For example, equalizer 303, carrier recovery circuit 304, timing update circuit 310 and echo canceler 309 can be operated in a reduced precision processing mode when a high quality communication channel 321 exists. The processing performed by receiver circuit 300 in the reduced precision mode in accordance with this variation is approximately 50 to 25 percent of the processing required in the full processing mode.

In a variation of this embodiment, the quality of the communication channel 321 can be determined using higher protocol layers, and the processing precision of receiver circuit 300 can be adjusted accordingly.

Where a given telephone line is intentionally configured to use reduced symbol rates or relaxed number of bits per symbol, as in the case where subscriber data rates are adjusted according to class of service, then processing within receiver circuit 300 can be reduced.

In another variation, echo canceler 309 can monitor the coefficients which used to generate the echo signal. There are typically a predetermined number of coefficients used to generate the echo signal. If certain coefficients are small enough to be ignored, the number of coefficients used to generate the echo signal can be reduced (with the insignificant coefficients being ignored). As a result, the processing requirements of echo canceler 309 are advantageously reduced.

The previously described methods are based on modem formats that continuously signal on a communication channel, using distinguished idle symbol sequences within the modulation to indicate the absence (and presence) of data.

ALTERNATIVE EMBODIMENTS

Figure 1:
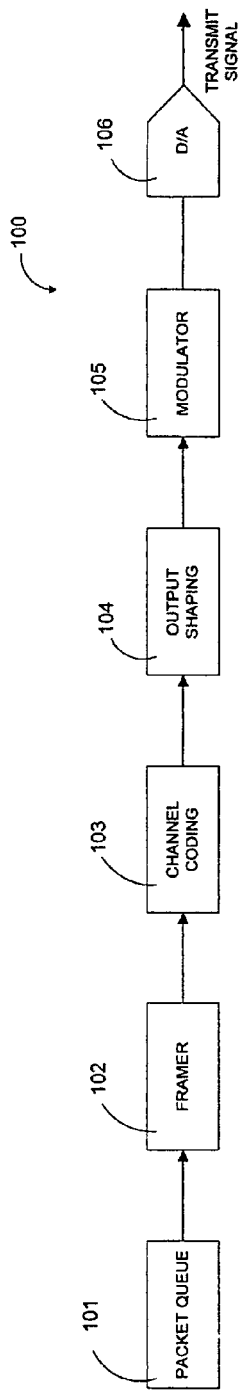
FIG. 1 is a block diagram of a transmitter circuit of a conventional modem.
Figure 2:
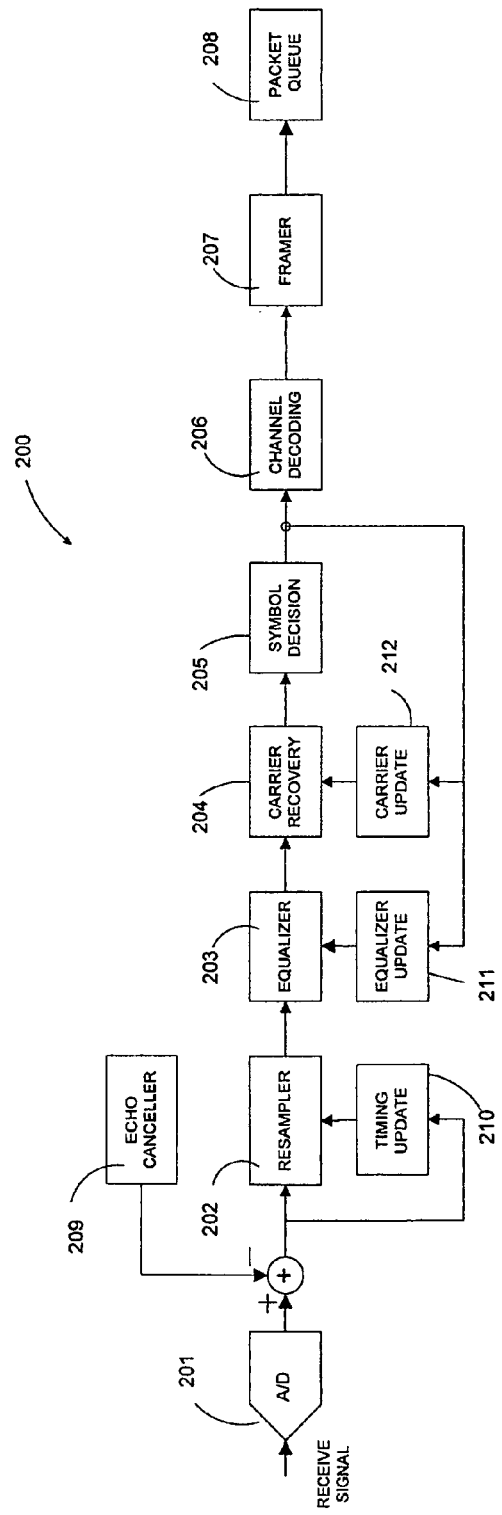
FIG. 2 is a block diagram of a receiver circuit of a conventional modem.

In accordance with another embodiment of the present invention, the transmitter and receiver circuits provide for direct support of packet traffic, as opposed to continuous bit streams, using low-level modem protocols. The protocol which facilitates this packet traffic will hereinafter be referred to as a burst-mode protocol. In the burst-mode protocol, the transmitter circuit does not transmit idle information as previously described in connection with transmitter circuit 100 (FIG. 1). Instead, the transmitter circuit transmits a predetermined non-idle state signal to indicate that packet data is about to be transmitted, and then transmits the packet data. If the transmitter circuit is not transmitting the predetermined non-idle state signal or packet data, the transmitter circuit does not transmit any signals on the communication channel. Stated another way, the transmitter circuit does not transmit idle information. The transmitter circuit only sends information when there is meaningful packet data available to be sent.

Figure 4:
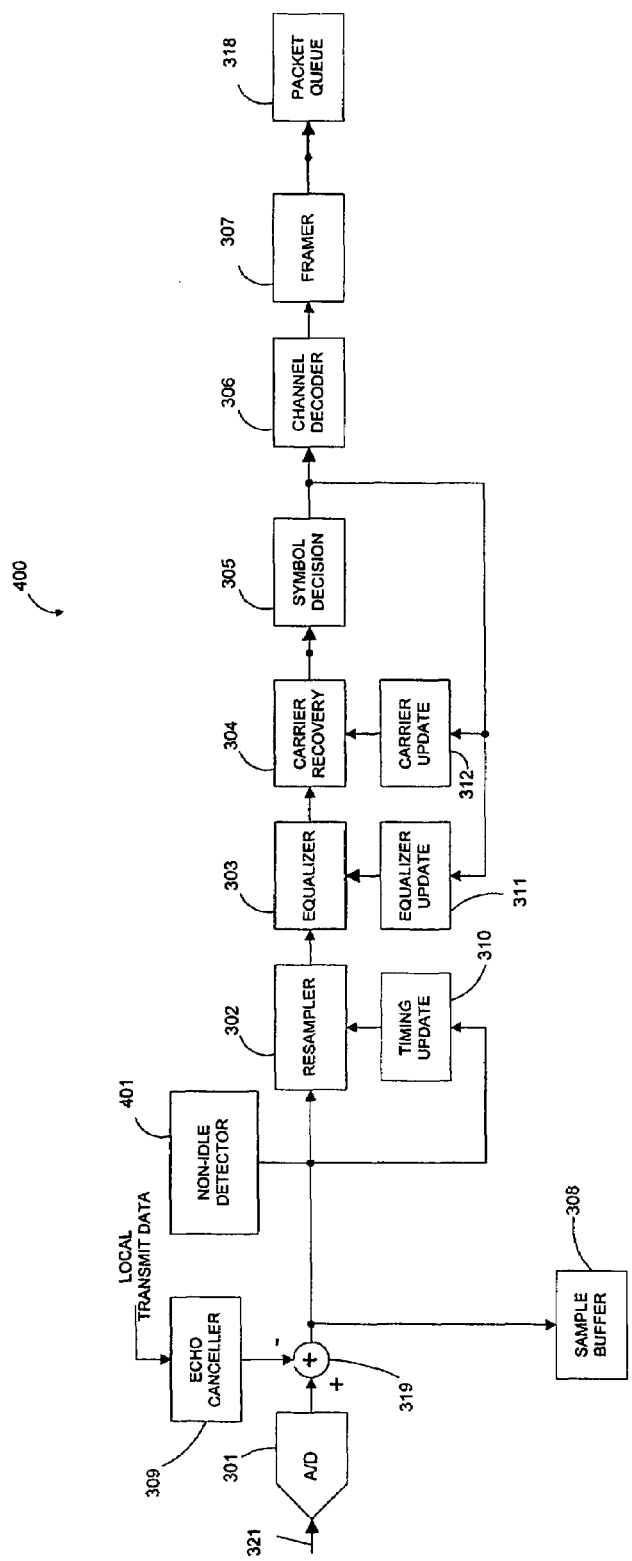
FIG. 4 is a block diagram of a receiver circuit of a modem in accordance with a burst-mode protocol of the present invention.

FIG. 4 is a block diagram of a receiver circuit 400 in accordance with the burst-mode protocol. Many of the elements of receiver circuit 400 are similar to elements previously described in connection with receiver circuit 300 (FIG. 3). Thus, similar elements in FIGS. 3 and 4 are labeled with similar reference numbers. Thus, receiver circuit 400 includes A/D converter 301, resampler 302, equalizer 303, carrier recovery circuit 304, symbol decision circuit 305, channel decoder 306, framer/idle detector 307, sample buffer 308, echo canceler 309, timing update circuit 310, equalizer update circuit 311, carrier update circuit 312 and packet queue 318. In addition, receiver circuit 400 includes a non-idle detector circuit 401, which is coupled to receive the output signal provided by summing node 319.

In the burst-mode protocol, the presence of packet data (i.e., an analog signal burst) is immediately preceded by a predetermined signalling on the communication channel (i.e., a non-idle state signal). This signalling is selected to be detected by non-idle detector 401 without the computational complexity of full demodulation. Three such signalling schemes are discussed below.

First, an easily detected signal, such as a pure tone, can be used to signal the presence of packet data (hereinafter referred to as a DATA state) and the absence of packet data (hereinafter referred to as a NO DATA state). In the described example, the easily detected signal is prefixed to the onset of the transmission of packet data. Upon detecting the easily detected signal, non-idle detector 401 enables the full processing mode of receiver circuit 400, thereby causing receiver circuit 400 to perform full demodulation on the incoming RECEIVE signal. After the packet data has been received, non-idle detector 401 detects the absence of the easily detected signal (and the packet data) on the communication channel, and in response, enables a reduced processing mode of receiver circuit 400. To enable the reduced processing mode of receiver circuit 400, non-idle detector 401 disables resampler 302, equalizer 303, carrier recovery circuit 304, symbol decision circuit 305, channel decoder 306, framer/idle detector 307, echo canceler 309, timing update circuit 310, equalizer update circuit 311, carrier update circuit 312 and packet queue 318 of receiver circuit 400, thereby simplifying the modem function when there is no packet data being received (i.e., during the NO DATA state).

In a second scheme, non-idle detector 401 monitors the presence and absence of carrier energy within the communication channel to determine whether packet data is being received. Upon detecting carrier energy within the communication channel, non-idle detector 401 enables the full processing mode of receiver circuit 400. When no carrier energy (or a minimum carrier energy) is detected within the communication channel, non-idle detector 401 enables the reduced processing mode of receiver circuit 400.

In a third scheme, a sub-carrier signal is used to signal the presence and absence of packet data. In this embodiment, the sub-carrier signal is demodulated with much less computational requirements than the packet data. One example of a signalling protocol which uses a sub-carrier signal is multi-carrier modulation (MCM) signalling. One example of multi-carrier modulation signalling is Discrete Multi-Tone (DMT) signalling. Although the receiver circuit used in connection with an MCM signalling protocol (hereinafter an MCM receiver circuit) is different from receiver circuit 400, such an MCM receiver circuit is well known in the art and can be adapted for use with a non-idle detector in the manner described below.

In MCM signalling, the received analog signal consists of multiple sub-channels in the frequency domain. In such a format, one of these sub-channels is used by the associated transmitter circuit to signal the presence of the DATA state. A non-idle detector circuit is coupled to receive the selected sub-channel of the incoming MCM signal. Upon detecting the sub-channel signalling, the non-idle detector circuit causes the receiver circuit to enter into a full processing mode, in which the received analog signal is processed using the full processing capabilities of the receiver circuit. After the packet data has been transmitted, the sub-channel signal is de-asserted. Upon detecting the absence of the sub-channel signal, the non-idle detector enables a reduced processing mode within the receiver circuit.

In the foregoing schemes, receiver circuit 400 (or the MCM receiver circuit) operates with a reduced level of processing to monitor the communication channel to detect the presence of a DATA state. After a timeout period has expired, the communication channel can automatically be assigned to a call-inactive status, and the detection processing performed by non-idle detector 401 can be reduced. The associated transmitter circuit can then initiate a session by transmitting a non-idle state signal long enough to ensure that non-idle detector 401 detects the subsequent DATA state. Alternatively, receiver circuit 400 can periodically poll the other end of the communication channel (i.e., the associated transmitter circuit), and only enable non-idle detector 401 during a window following each poll.

Alternatively, receiver circuit 400 can periodically enable the non-idle detector 401 during predetermined time intervals which can be used by the remote transmitter circuit to signal the transmission of a packet. A periodic poll or some other timing signal would be used to maintain synchronization of these time intervals between receiver circuit 400 and the remote transmitter circuit. In the case of a multi-line access network access circuit (described in more detail below in connection with FIG. 5), the time intervals can be staggered across the multiple lines such that idle detection can be shared across those lines. In this manner, the processing requirements of the receiver circuit 400 are further reduced.

In a particular embodiment, receiver circuit 400 is implemented in software in a subscriber's personal computer (PC). In this embodiment, the processing resources required to implement receiver circuit 400 are greatly reduced during the NO DATA state. For example, when receiver circuit 400 demodulating a standard V.34 signal is in the full processing mode (i.e., during a DATA state), approximately 40 percent of a 100 MHz Pentium™ PC's computing resources may be consumed by the implementation of receiver circuit 400. However, during the reduced processing mode (i.e., during a NO DATA state), this percentage can be reduced by approximately one order of magnitude.

As previously described, when no packet data is being received, there is a statistically significant reduction in the amount of processing required within receiver circuit 400. This reduction in processing can be used to reduce power consumption.

In accordance with another aspect of the invention, the quality of communication channel 321 can be determined in the manner previously described in connection with receiver circuit 300 (FIG. 3). If the quality of communication channel 321 is determined to be relatively high, then the processing within receiver circuit 400 can be reduced in the manner previously described in connection with receiver circuit 300.

In accordance with another aspect of the invention, when using the burst-mode protocol, the local transmitter circuit associated with receiver circuit 400 will not be continuously transmitting. During the periods when the local transmitter circuit is not transmitting local transmit data, there is no possibility of an echo signal on communication channel 321. Accordingly, echo canceler 309 can be disabled when the local transmitter circuit is not transmitting packet information, thereby further reducing the processing requirements of receiver circuit 300.

Figure 5:
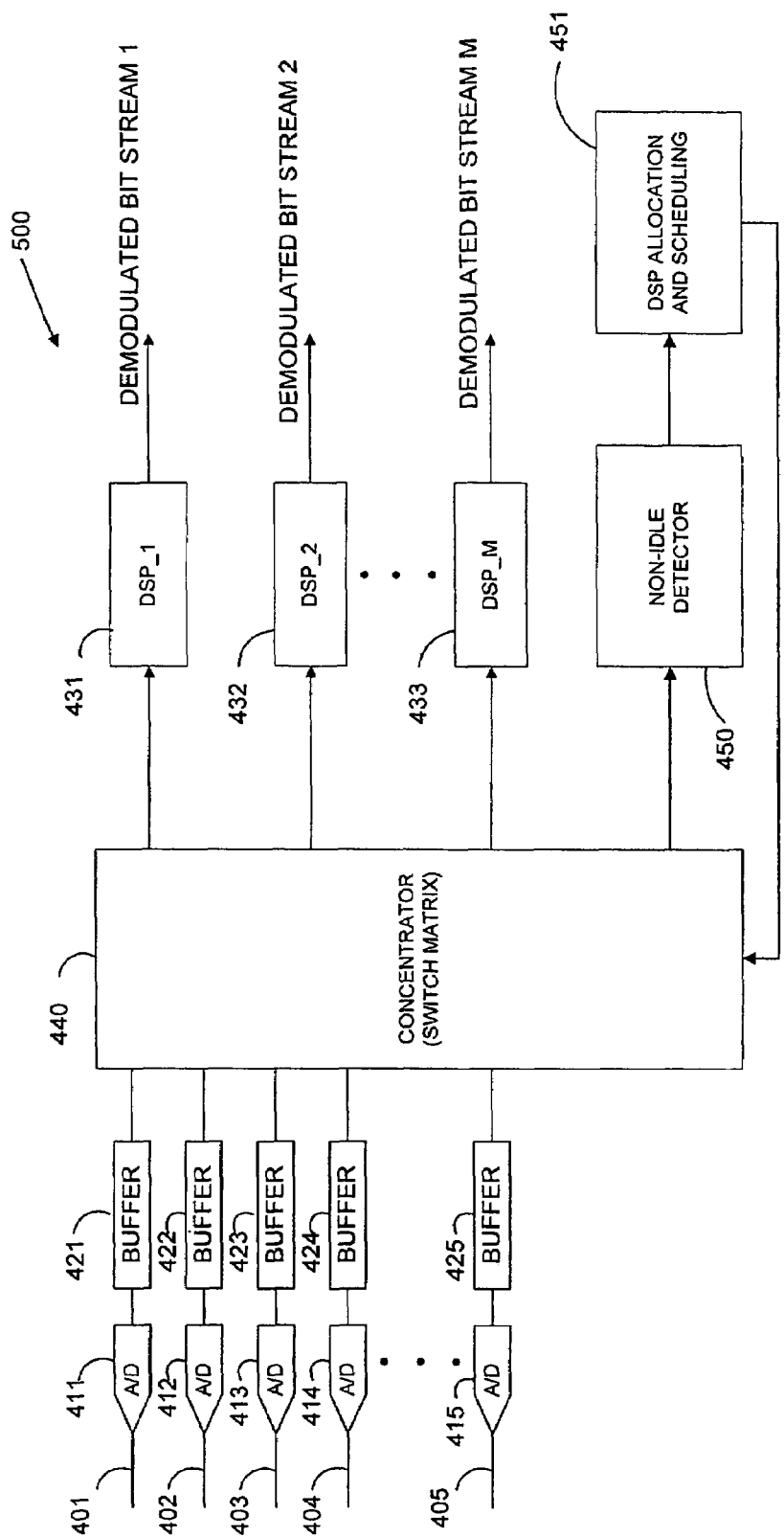
FIG. 5 is a block diagram of a multi-line network access circuit which can be located in a central office in accordance with one embodiment of the invention.

In another embodiment, receiver circuit 400 is used in a telephone company central office to implement a multi-line network access circuit (i.e., increase the number of lines that can be handled by a single DSP resource). FIG. 5 is a block diagram of a multi-line network access circuit 500 which can be located in a central office. In another embodiment, multi-line network access circuit 500 can be used by an internet service provider (ISP). Multi-line network access circuit 500 includes a first number N of incoming communication channels 401-405 (e.g., telephone lines), a corresponding number of A/D converters 411-415 and buffers 421-425, a switch matrix 440, a second number M of digital signal processing resources 431-433, a non-idle detector circuit 450 and DSP allocation and scheduling circuit 451. In the described embodiment, N is an integer greater than one, and M is an integer greater than or equal to one. In a particular example, N is equal to 100, while M is equal to 10. The ratio of N:M is referred to as the concentration ratio. The larger the concentration ratio, the fewer the number of DSP resources required to support a large number of incoming signal lines. In the described embodiment, the concentration ratio is greater than 1:1.

Each of the corresponding telephone lines 401-405 is coupled to a corresponding subscriber (not shown). Each subscriber has one or more transmitter circuits which transmit non-idle state signalling and packet data on the corresponding line in accordance with the burst mode protocol previously described. Each of lines 401-405 is coupled to a dedicated A/D converter 411-415. Each of A/D converters 411-415 is substantially equivalent to the previously described A/D converter 301 (FIGS. 3 and 4). Typically, each of A/D converters 411-415 is located within a codec which also includes a corresponding D/A converter (not shown).

Each of the A/D converters 411-415 is coupled to a dedicated buffer circuit 421-425. Each of buffer circuits 421-425 operates in a first in, first out manner, and stores a plurality of samples of the incoming signals. Buffer circuits 421-425 are coupled to switch matrix 440. Switch matrix 440 is controlled to provide the output signals from each of buffers 421-425 to non-idle detector 450. Non-idle detector 450, which includes N non-idle detector circuits (one for each of lines 401-405), monitors the signals provided by buffer circuits 421-425. In response, non-idle detector 450 determines which of the lines 401-405 are in a DATA state and which of the lines 401-405 are in a NO DATA state. At any given time, it is probable that only a few (if any) of the lines 401-405 will be in the DATA state. As a result, it is possible to multiplex the packet data on the plurality of lines 401-405 into a single one of the DSP circuits 431-433.

In the described embodiment, each of DSP circuits 431-433 includes the following elements which were previously described in connection with receiver circuits 300 and 400 (FIGS. 3 and 4): resampler 302, equalizer 303, carrier recovery circuit 304, symbol decision circuit 305, channel decoder 306, framer/idle detector 307, sample buffer 308, echo canceler 309, timing update circuit 310, equalizer update circuit 311, carrier update circuit 312, and summing node 319.

Non-idle detector 450 generates a plurality of control signals which are provided to DSP allocation and scheduling circuit 451. These control signals indicate which of the lines 401-405 are carrying packet data at any given time. In response to the control signals, DSP allocation and scheduling circuit 451 routes the received packet data from buffers 421-425 to DSP circuits 431-433. DSP circuits 431-433 operate in the manner previously described in connection with FIGS. 3 and 4 to provide demodulated bit streams. The demodulated bit streams provided by DSP resources 431-433 are routed over digital switching circuitry to an end destination, such as internet service provider (ISP).

Figure 6:
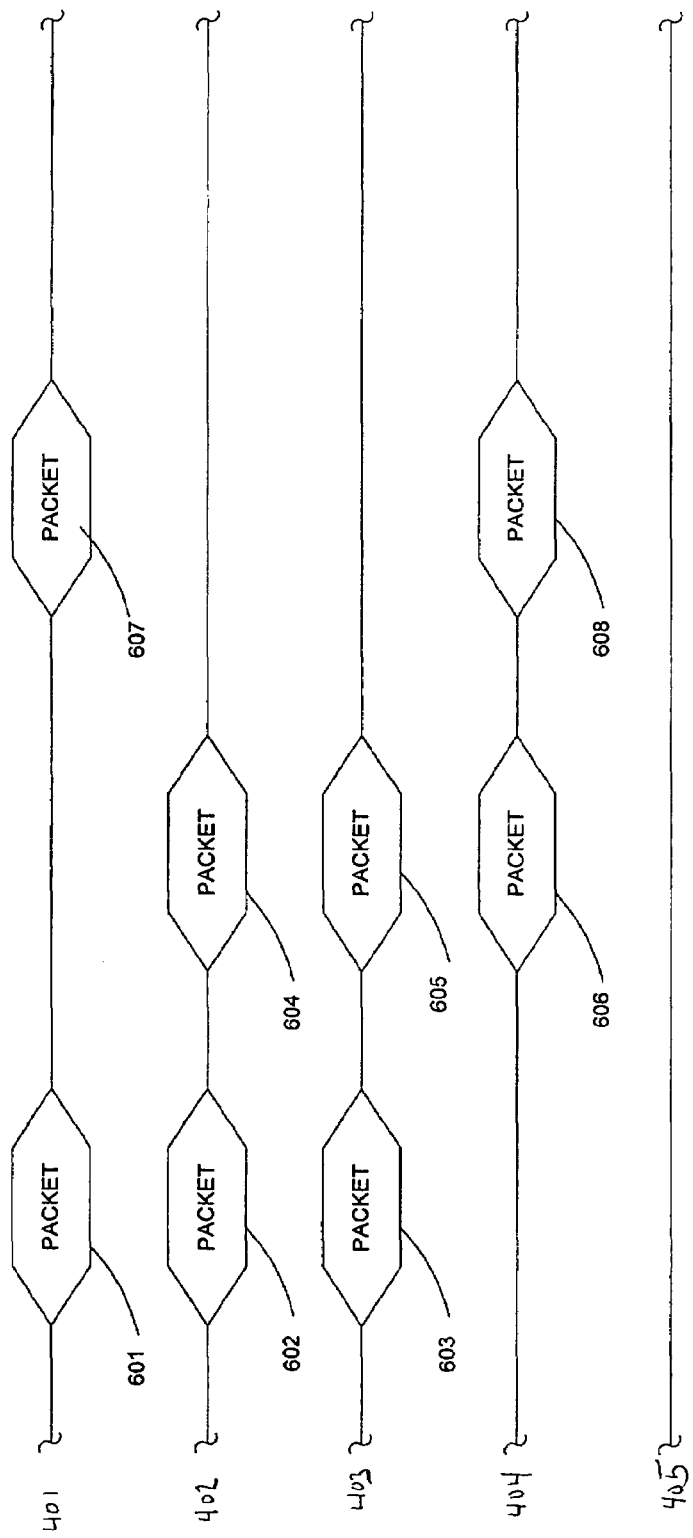
FIG. 6 is a schematic diagram of packet data received on the multiple lines of the multi-line network access circuit of FIG. 5 in accordance with one embodiment of the invention.

The following example will further illustrate how DSP allocation and scheduling circuit 451 routes the received packet data. FIG. 6 is a schematic diagram of packet data received on lines 401-405. In this example, data packets 601, 602 and 603 are simultaneously transmitted on lines 401, 402 and 403, respectively. At this time, lines 404 and 405 are in a NO DATA state. Non-idle detector 450 detects the presence of data packets 601, 602 and 603 in accordance with one of the previously described non-idle signalling schemes. Non-idle detector 450 transmits control signals to DSP allocation and scheduling circuit 451 indicating the presence of packet data on lines 401, 402 and 403. In response, DSP allocation and scheduling circuit 451 controls switch matrix 440 to route the output signals from lines 401, 402 and 403 to different ones of DSP circuits 431-433. For example, the packet information on line 401 can be routed to DSP circuit 431, the packet information on line 402 can be routed to DSP circuit 432, and the packet information on line 403 can be routed to DSP circuit 433.

Subsequently, data packets 604, 605 and 606 are received on lines 402, 403 and 404, respectively. Again, non-idle detector 450 detects these data packets 604-606, and informs DSP allocation and scheduling circuit 451. In response, DSP allocation and scheduling circuit 451 controls switch matrix 440 to route the data packets 604, 605 and 606 to different DSP circuits 431-433. For example, data packet 604 on line 402 can be routed to DSP 432, data packet 605 on line 403 can be routed to DSP 433, and data packet 606 on line 404 can be routed to DSP 431. In this manner, DSP 431 is used to process packet data from both line 401 and line 404 (i.e., data packets 601 and 606).

Subsequently, data packets 607 and 608 are received on lines 401 and 404, respectively. Again, non-idle detector 450 detects these data packets 607-608, and informs DSP allocation and scheduling circuit 451. DSP allocation and scheduling circuit 451 controls switch matrix 440 to route data packets 607 and 608 to different DSP circuits 431-433. For example, data packet 607 on line 401 can be routed to DSP 431 and data packet 608 on line 404 can be routed to DSP 432. In this manner, DSP 432 is used to process packet data from both line 402 and line 404 (i.e., data packets 602, 604 and 608).

DSP allocation and scheduling circuit 451 establishes and removes the previously described routing connections by a scheduling algorithm that uses information about queue occupancy and link activity detection to identify those lines that have data to process.

In accordance with the foregoing description, each of DSP resources 431-433 is capable of processing packet information from a plurality of lines 401-405. To facilitate such processing, each of DSP resources 431-433 stores several sets of update coefficients. Each set of update coefficients corresponds with a particular communication channel established on one of line 401-405. For example, if DSP resource 431 is processing packet data received on lines 401 and 404, then DSP resource stores two sets of update coefficients. A first set of update coefficients is selected in view of the operating characteristics of the session established on line 401 and a second set of update coefficients is selected in view of the operating characteristics of the session established on line 404. The first set of update coefficients is enabled within DSP resource 431 when receiving packet data on line 401, and the second set of update coefficients is enabled within DSP resource 431 when receiving packet data on line 404. The various sets of update coefficients are enabled by DSP allocation and scheduling circuit 451. Each set of update coefficients include the update coefficients associated with timing update circuit 310, equalizer update circuit 311 and carrier recovery update circuit 312 within the DSP resource (FIGS. 3 and 4).

By storing the update coefficients associated with the various communication channels, DSP resources 431-433 can quickly become operational upon receiving packet information (because the update coefficients do not need to be re-established). This scheme works well because the same communication link, having relatively constant signal transmission characteristics, exists on lines 401-405 for the duration of each session.

One result of the previously described multi-line network access circuit 500 is a reduction in the real-time digital signal processing requirements. In conventional systems, sufficient DSP resources must be dedicated to each line to continuously perform the full modem function. However, within multi-line network access circuit 500, most of the DSP resources 431-433 are freed up for most of the time, and can be applied to other lines that have active packet traffic.

Given a system designed with a certain concentration ratio, such as 10:1, there is some probability that more than 10 percent of the lines 401-405 may be receiving packet information at the same time. By design, this probability is minimized to an acceptable level, by controlling the concentration ratio based on observed or predicted traffic intensities.

In existing systems with session-based concentration mechanisms (such as call-connection used in voice and ISDN networks), when the offered traffic load instantaneously exceeds the available resources, communication is blocked. However, in accordance with the present invention, buffers 421-425 store input samples for subsequent full precision processing. Such buffering allows communication to proceed during periods of instantaneous oversubscription with the introduction of some additional latency. As long as DSP resources 431-433 have sufficient capacity over the buffer time period to process all of the received packet information, no packet information will be blocked.

In the described embodiment, input samples for each of lines 401-405 are stored in corresponding buffer circuits 421-425. DSP allocation and scheduling circuit 451 implements a service queue model to schedule the processing of the input samples within DSP resources 431-433. Buffer circuits 421-425 enable the smoothing of instantaneous packet traffic peaks, where packets arrive on many of the lines 401-405 coincidentally. The scheduling capability can be used with a Quality of Service policy mechanism to allocate DSP resources 431-433 to those lines 401-405 that require lower latency and/or lower retransmission rate.

Additionally, this invention includes a signalling method from the system of DSP resources 431-433 back to each of the modems coupled to communication channels 401-405. This signalling method is used to indicate the buffer fill level and can be used by the remote modems to temporarily reduce the packet transmission rates, thereby controlling the oversubscription of the system.

Figure 7:
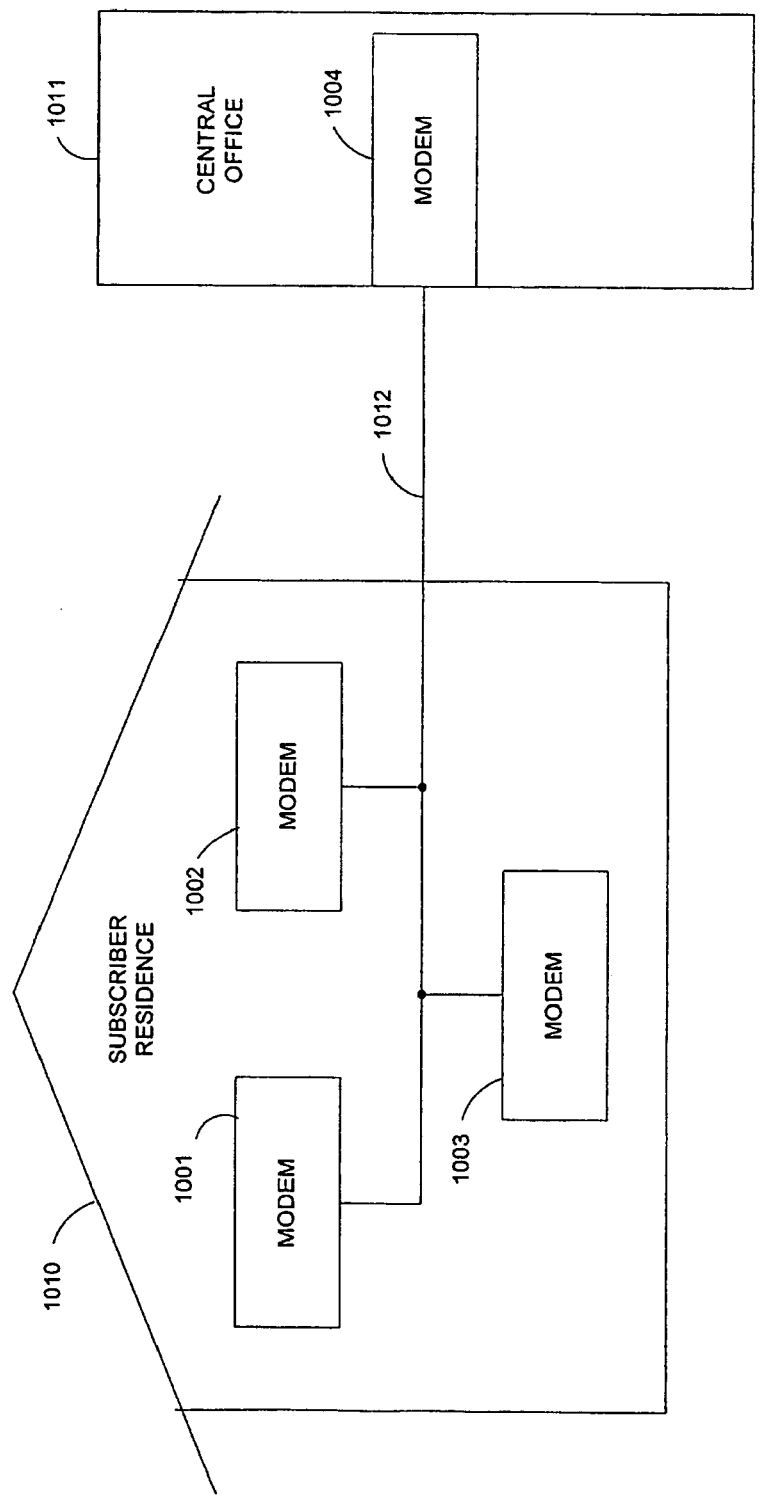
FIG. 7 is a schematic diagram of a multi-drop configuration which includes modems in a subscriber's residence and a modem in the telephone company central office.

In accordance with another embodiment of the invention, the burst-mode protocol effectively enables multi-drop operation. In multi-drop operation, multiple modems connected are connected to the same communication channel using time-division multiplexing. For example, in accordance with multi-drop operation, a subscriber can operably couple more than one modem to a single telephone line. FIG. 7 is a schematic diagram of a multi-drop configuration which includes modems 1001-1003 in the subscriber's residence 1010, and modem 1004 in the telephone company central office 1011. Modems 1001-1004 are coupled by a twisted pair telephone line 1012. Each of modems 1001-1004 include a transmitter circuit and a receiver circuit which operate in accordance with the previously described burst-mode protocol. Because the transmitter circuits in modems 1001-1004 do not generate IDLE symbols in accordance with the burst-mode protocol, these transmitter circuits do not introduce any traffic onto telephone line 1012 during the time that the transmitter circuits of modems 1001-1004 are not transmitting packets. As a result, any of the transmitter circuits of modems 1001-1004 can establish a session on telephone line 1012 as follows.

First, the transmitter circuits coupled to the common line 1012 can transmit packets whenever necessary. However, this may introduce collisions between packet information sent by the transmitter circuits. A better solution is to use a carrier sense multiple access (CSMA) scheme, where each transmitter circuit listens to the communication channel prior to sending packet information. A common extension to CSMA is CSMA/CD in which transmissions are immediately terminated if collisions are detected. Such CSMA schemes are commonly used in the ethernet field. These CSMA schemes enable effective communication between all modems connected to a single telephone twisted pair wire (e.g., line 401), including a plurality of modems in the subscriber's home (or business) and a modem in the telephone company central office (e.g., the modem which includes DSP resource 431).

An alternative to the contention based protocols described above are a class of schemes commonly referred to as reservation based protocols. Applying these well known techniques, multiple modems would use a separate arbitration channel to decide which modem gains access to the channel.

In an alternative embodiment, multi-drop access is provided by implementing well known time division multiple access (TDMA) techniques in which every transmitter circuit is assigned a fixed time slot during which to transmit packet information. The advantage of this scheme is ease of implementation.

In yet other embodiments, multi-drop access is provided by implementing conventional frequency division multiple access (FDMA) schemes, code division multiple access (CDMA) arbitration schemes, or data sense multiple access (DSMA) schemes.

Figure 8:
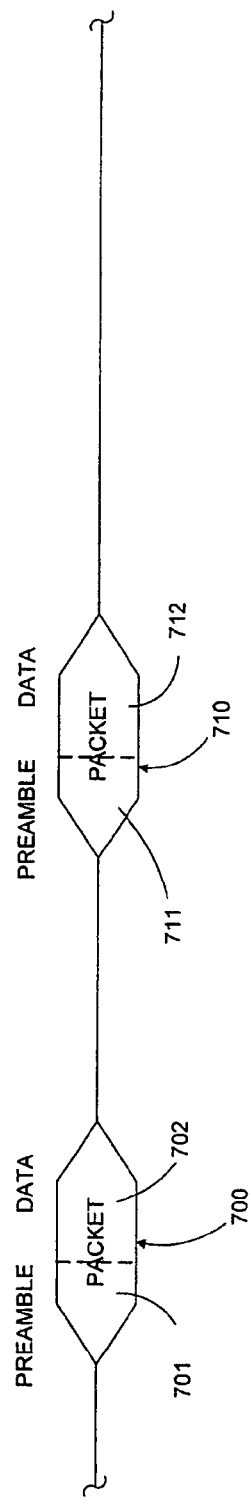
FIG. 8 is a schematic representation of packet information which is transmitted by transmitter circuits in accordance with the burst-mode protocol of the present embodiment.

In accordance with another aspect of the present invention, the burst-mode protocol enables multiple transmitter circuits to transfer data at different rates in a rate adaptive manner. FIG. 8 is a schematic representation of packet information which is transmitted by transmitter circuits in accordance with the burst-mode protocol of the present embodiment. In the described example, it is assumed that packet 700 is transmitted by the transmitter circuit of modem 1001. This packet 700 can be transmitted to any one or more of the other modems 1002-1004. Packet 700 includes a preamble 701 and a main body 702. Packet 700 is transmitted using a gated modulation or gated carrier signal. Preamble 701, which is approximately 20 to 100 symbols in length, includes information identifying the nature of the packet 700. For example, preamble 701 can include information which identifies: (1) a version or type field for the preamble, (2) packet source and destination addresses, (3) the line code (i.e., the modem protocol being used), (4) the data rate, (5) error control parameters, (6) packet length and (7) a timing value for the expected reception slot of a subsequent packet.

The receiver circuits of the modems 1002-1004 coupled to the telephone line 1012 detect the information present in the preamble 701 and establish synchronization at the beginning of the packet 700. In the described embodiment, all preambles are transmitted at a relatively low, common transmission rate. The preamble 701 contains information which identifies the data rate of the main body 702 of the packet. For example, the preamble 701 may indicate that the main body 702 of the packet 700 includes data which is being transmitted at a higher data rate. The transmitter circuit of modem 1001 then transmits the main body 702 of the packet 700 at this higher rate. The receiver circuit identified by the destination address of preamble 701 receives the main body 702 of the packet 700 at the rate identified in the preamble 701.

Returning to FIG. 8, packet 710 is representative of a packet sent by a second transmitter circuit. In the described example, packet 710 is transmitted by modem 1004 in the central office 1011 to one or more of the modems 1001-1003 in the subscriber's residence 1010. Packet 710 includes preamble 711 and main body 712. Preamble 711 includes information which is transmitted at the same rate as the information of preamble 701. However, preamble 711 indicates that the main body 712 is transmitted at a second data rate, which is different from the data rate of the main body 702 of packet 700.

Because the receiver circuits are informed of these different data rates prior to receiving main body 702 and main body 712, the receiver circuits are able to adjust for these different data rates. More specifically, preamble 711 can be used to select a different set of update coefficients for use within the receiver circuit to process main body 712.

The previously described rate adaptive protocol allows both simple devices (which communicate at a relatively low speed) and complex devices (which communicate at a relatively high speed) to be operably coupled to a single telephone line at the same time. For example, modem 1001 can be located in a personal computer, while modem 1002 can be located in a "smart toaster" or similar appliance.

The previously described rate adaptive protocol allows a multi-line network access circuit to take advantage of reduced processing required for receiving packets that have a lower data rate in their main body. For example, an operator may offer subscribers lower rates in exchange for limiting packet traffic to lower data rates during certain times or under certain classes of service.

When the preamble in a burst-mode packet includes the destination address of the packet, the receiver circuits can monitor the destination address of the packet, and in response, filter packets which do not need to be demodulated, thereby reducing the processing requirements of the receiver circuits. In addition, when the preamble in a burst-mode packet includes a source address of the packet, the receiver circuit can recall appropriate stored configuration parameters to speed the acquisition/demodulation of the packet.

As previously described, the preamble can also contain error control information that will be used by the main body of the packet. Using this scheme, the same modem can accommodate both "expensive" error control schemes such as might be required for video applications, as well as "inexpensive" error control schemes which might be used for traditional packet traffic. Another portion of the error control information can be used to "request an acknowledgement" from the receiver circuit. If the received packet is acceptable, then the receiver circuit will cause an acknowledge (ack) signal to be transmitted to the modem residing at the source address. If the received packet is not acceptable, then the receiver circuit will cause a no acknowledge (nack) signal to be transmitted to the modem residing at the source address.

Figure 9:
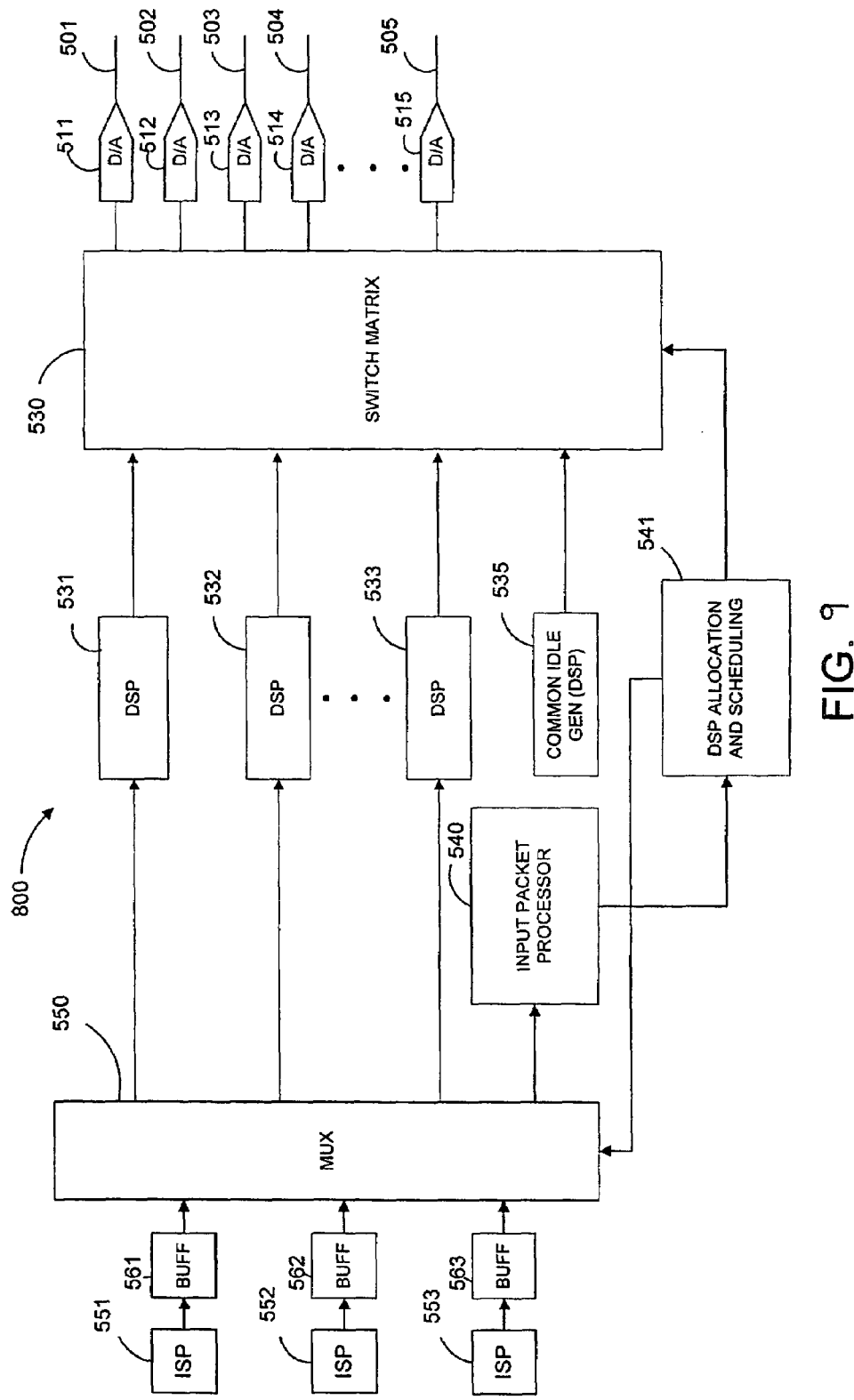
FIG. 9 is a block diagram of a multi-line network access circuit in accordance with another embodiment of the present invention.

FIG. 9 is a block diagram of a multi-line network access circuit 800 in accordance with another embodiment of the present invention. In general, multi-line network access circuit 800 facilitates the transmission of packet information from a source which generates digital packet information (e.g., an internet service provider) to a subscriber's modem which operates in response to a conventional modem protocol (i.e., packet data interleaved with idle information). Multi-line network access circuit 800 includes D/A converters 511-515, switch matrix 530, DSP resources 531-533, common idle generator 535, input packet processor 540, DSP allocation and scheduling circuit 541, multiplexer 550 and buffer circuits 561-563.

Multiplexer 550 is coupled to a plurality of internet service providers (ISPs) 551-553 through buffer circuits 561-563. The present invention is not limited to ISPs, but can be extended to any source which transmits digital packet data. Moreover, although three ISPs 551-553 are illustrated, it is understood that many other sources can be coupled to multiplexer 550.

Packets arriving from ISPs 551-553 are stored in the corresponding input buffers 561-563. The input packet processor 540 examines the destination addresses associated with the incoming packets stored in buffers 561-563. In response to these destination addresses, input packet processor 540 determines which subscriber telephone line 501-505 is to receive the packet. This information is transmitted to DSP allocation and scheduling circuit 541. In response, DSP allocation and scheduling circuit 541 selects one of the DSP resources 531-533 to modulate the packet data, and sends control signals to multiplexer 550, thereby routing the packets from the input buffers 561-563 to the selected DSP resources 531-533. DSP allocation and scheduling circuit 541 also controls switch matrix 530 to couple DSP resources 531-533 and common idle generator 535 to D/A converters 511-515. Each of the D/A converters 511-515 is coupled to a corresponding telephone line 501-505. Each of telephone lines 501-505 is connected to a subscriber who has a receiver circuit that is capable of receiving packet data and idle information. The following example will clarify the operation of multiplexer 550 and switch matrix 530.

Figure 10:
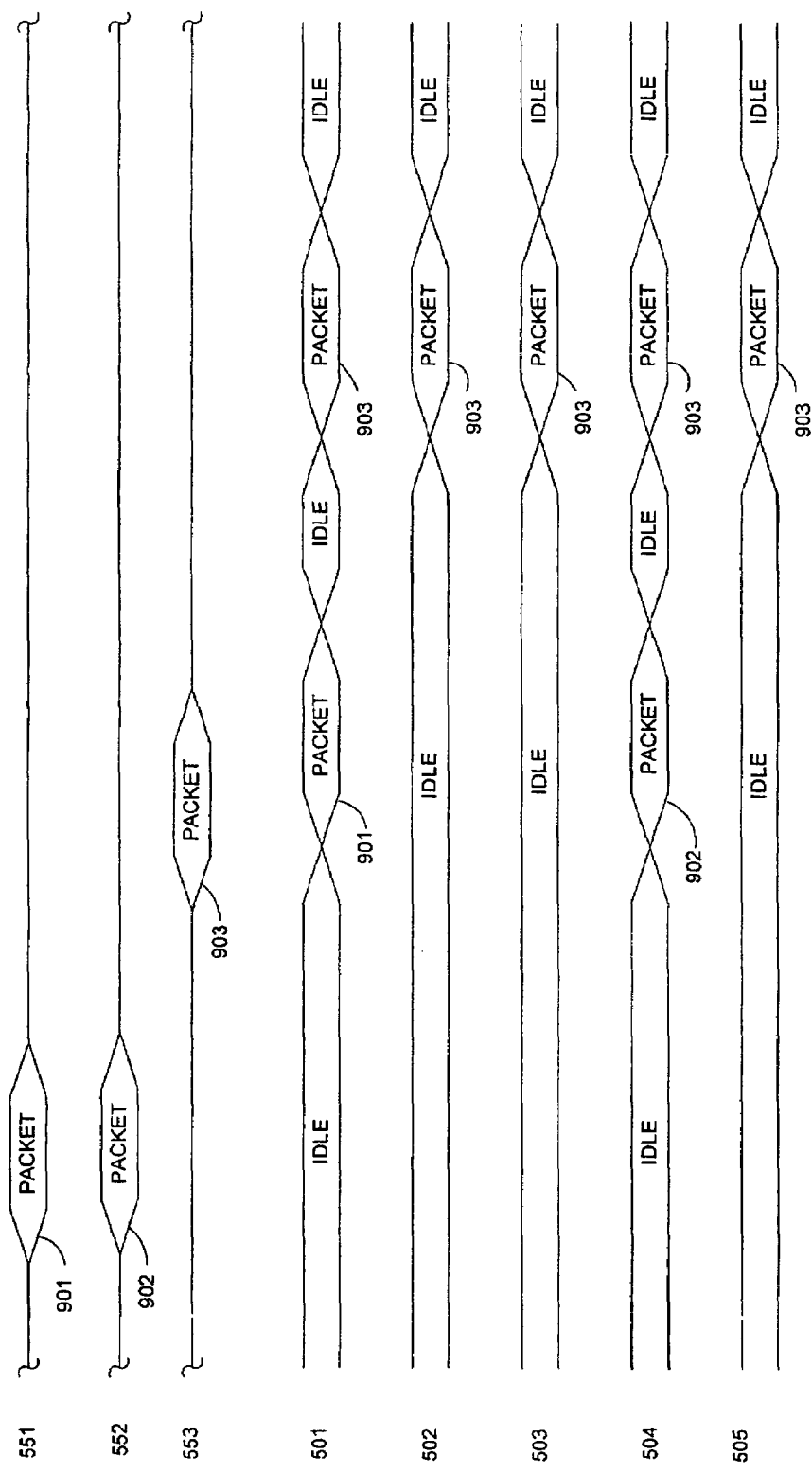
FIG. 10 is a schematic diagram of packet information received by and transmitted from the multiline network access circuit of FIG. 9.

FIG. 10 is a schematic diagram of packet data received from ISPs 551-553. In this example, ISPs 551 and 552 simultaneously transmit data packets 901 and 902, respectively. At this time, ISP 553 is not transmitting a data packet. Packets 901 and 902 are received in input buffers 561 and 562, respectively. Input packet processor 540 detects the arrival of data packets 901 and 902, notifies DSP allocation and scheduling circuit 541. In response, DSP allocation and scheduling circuit 541 selects which DSP resource will process each packet. In the present example, packet 901 is routed to DSP resource 531 and data packet 902 is routed to DSP resource 532, although any other combination of resource assignment is possible, including the allocation of both packets 901 and 902 to a single DSP resource.

In addition, DSP allocation and scheduling circuit 541 controls switch matrix 530 as follows. Assume that the data packet 901 transmitted by ISP 551 is intended for a subscriber connected to telephone line 504 and that data packet 902 is intended for a subscriber connected to telephone line 501. In this case, switch matrix 530 is controlled to couple DSP resource 531 to D/A converter 514. In addition, switch matrix 530 is controlled to couple DSP resource 532 to D/A converter 511. At the same time, switch matrix 530 is controlled to couple the remaining active D/A converters 512, 513 and 515 to common idle generator 535. Common idle generator 535 generates a stream of idle information in accordance with a conventional modem protocol. In one embodiment, common idle generator 535 generates the stream of idle information in the manner previously described in connection with idle generator 314 and idle symbol predictor 316 (FIG. 4). In another embodiment, where the stream of expected idle information repeats with a reasonable period, the stream of expected idle information can be pre-computed and stored in a buffer memory within common idle generator 535. This buffer memory is then accessed when common idle generator 535 is to generate the common idle signal.

As a result, data packet 902 is transmitted on telephone line 501, data packet 901 is transmitted on telephone line 504, and idle information is transmitted on telephone lines 502, 503 and 505. After the transmission of data packets 901 and 902 is complete, DSP allocation and scheduling circuit 541 causes switch matrix 530 to couple D/A converters 511 and 514 to common idle generator 535, thereby transmitting idle information on lines 501 and 504.

In the foregoing manner, only one DSP resource (i.e., common idle generator 535) is required to generate idle information for a relatively large number of telephone lines. This advantageously results in a reduced amount of processing within multi-line network access circuit 800, when compared with prior art systems which require a dedicated idle generator for each of telephone lines 501-505.

Multi-line network access circuit 800 also facilitates an efficient multi-cast transmission scheme. Assume that ISP 553 is to transmit the same data packet 903 (FIG. 10) to each of telephone lines 501-505. To accomplish this, multiplexer 550 is controlled to route the data packet to one of DSP resources 531-533 (e.g., DSP resource 531). DSP allocation and scheduling circuit 541 causes switch matrix 530 to route the output signal provided by DSP 531 to each of D/A converters 511-515. As a result, the data packet is simultaneously multi-cast on telephone lines 501-505 using a single one of DSP resources 531-533 (See, FIG. 10).

Multi-cast data packets can be interleaved with uni-cast data packets (i.e., data packets which are transmitted to a single subscriber) using synchronous or asynchronous methods. In a synchronous method, the multi-cast data packets are transmitted from a common buffer in a time aligned manner on all of the lines 501-505. In this method, the common buffer is continuously loaded by the selected DSP resource. This requires that time slots be reserved across the set of channels for multi-cast data, and that DSP allocation and scheduling circuit 541 control the uni-cast data transmissions to not overlap with the time slots reserved for multi-cast data transmission.

In an asynchronous method, the multi-cast and uni-cast data samples for each channel are stored in a buffer associated with the channel. Each of lines 501-505 is driven by data stored in a corresponding buffer. This enables the multi-cast data to be sent at different times on each individual line, removing the time slot reservation restriction of the previously described synchronous method.

In one variation, common idle generator 541 is eliminated from multi-line network access circuit 800, such that idle information is not inserted between the packet data. In this variation, the receiver circuits coupled to lines 501-505 are replaced with receiver circuits which operate in response to the previously described burst-mode protocol. The non-idle signalling required to indicate the presence of a DATA state in accordance with the burst-mode protocol is performed within multi-line network access circuit 800. For example, this signalling can be implemented by the individual DSP resources 531-533 or by a common signalling circuit (not shown) which is controlled by DSP allocation and scheduling circuit 541.

An alternative configuration of multi-line access circuit 800 includes multiple modems that do not include D/A converters 511-515, but instead provide aggregated digital signals directly to a digital trunk line of the telephone network. The previously described techniques apply to this configuration as well. Similarly, A/D converters 411-415 can be eliminated from multi-line network access circuit 500 (FIG. 5). In such an embodiment, multi-line network access circuit 500 receives aggregated digital signals directly from a digital trunk line of the telephone network.

Although the invention has been described in connection with several embodiments, it is understood that this invention is not limited to the embodiments disclosed, but is capable of various modifications which would be apparent to one of ordinary skill in the art. For example, although the present modems have been described in terms of codecs and DSP chips, it is understood that the modems in accordance with the present invention can be implemented entirely by software within a conventional X86 or X86 with MMX processor. Moreover, although the present invention has been described in connection with communication channels which are telephone lines, it is understood that other types of communication channels can be used to implement the present invention. In addition, although the present invention has been described in connection with selected modulation techniques (i.e., QAM and MCM) it is understood that other modulation techniques, such as carrier-less amplitude and phase (CAP) modulation, can be used. Moreover, although the receiver circuits 300 and 400 (FIGS. 3 and 4) have been described as having a resampler 302, it is understood that in embodiments which process baud synchronous samples, the resampler 302 can be eliminated from these receiver circuits. Thus, the invention is limited only by the following claims.

What is claimed is:

1. A method of controlling receiver processing in a communications receiver in response to an absence or presence of analog signal bursts containing packet data on a communications channel, comprising:
   monitoring the communications channel to detect a presence or an absence of the analog signal bursts; and
   reducing the receiver processing in the absence of analog signal bursts, wherein reducing the receiver processing includes reducing processing precision of one or more elements of the receiver.

2. The method of claim 1, further comprising enabling full receiver processing in the presence of analog signal bursts.

3. The method of claim 1, further comprising increasing receiver processing in the presence of analog signal bursts.

4. The method of claim 1, wherein the analog signal bursts are in accordance with a burst mode protocol for operating a modem on a telephone line, the burst mode protocol including modulating packets of digital information by a transmitter circuit of the modem, wherein packets of digital information are converted into analog signal bursts of discrete duration and are transmitted from the transmitter circuit to the circuit to the telephone line.

5. The method of claim 1, further comprising:
   the analog signals bursts being in accordance with a burst-mode protocol wherein the presence of an analog signal burst is immediately preceded by a predetermined non-idle state signal on the communications channel;
   upon detecting the predetermined non-idle state signal on the communications channel performing full demodulation on the analog signal burst to obtain packet data; and
   after the packet data from the analog signal burst has been received, and upon detecting the absence of the predetermined non-idle state signal on the communication channel reducing receiver processing.

6. The method of claim 5, wherein the predetermined non-idle state signal is a pure tone.

7. A method of controlling receiver processing in a communications receiver in response to an absence or presence of analog signal bursts containing packet data on a communications channel comprising:
   monitoring quality of the analog signal bursts on the communication channel; and
   reducing processing performed by the communications receiver if the communication channel quality exceeds a predetermined level, wherein reducing processing performed by the communications receiver includes reducing processing precision of one or more elements of the receiver.

8. The method of claim 7, wherein:
   the monitoring quality includes monitoring error correction circuitry present in a channel decoder to determine whether a large or small amount of error correction is being performed; and
   if the communication channel quality exceeds the predetermined level, reducing processing within the communications receiver by operating predetermined receiver circuits in a reduced precision processing mode.

9. A method of controlling receiver processing in a communications receiver in response to an absence or presence of analog signal bursts containing packet data on a communications channel comprising:
   monitoring the presence and absence of analog signal burst carrier energy within the communication channel to determine whether packet data is being received; and
   upon detecting no or minimum analog signal burst carrier energy is within the communication channel enabling reduced receiver processing, wherein enabling reduced receiver processing includes reducing processing precision of one or more elements of the receiver.

10. The method of claim 9, further comprising upon detecting analog signal burst carrier energy within the communication channel enabling full receiver processing.

11. The method of claim 9, further comprising upon detecting analog signal burst carrier energy within the communication channel increasing receiver processing.

12. A method of controlling receiver processing in a communications receiver in response to an absence or presence of analog signal bursts containing packet data on a communications channel, comprising:
   monitoring the absence of the analog signal burst sub-carrier signals within the communication channel to determine whether packet data is being received; and
   upon detecting the absence of the analog signal burst sub-carrier signals on the communication channel reducing receiver processing by disabling predetermined receiver circuits.

13. The method of claim 12, further comprising upon detecting the analog signal burst sub-carrier signals enabling a full processing mode of the communications receiver to perform full demodulation on the analog signal burst to obtain packet data.

14. The method of claim 12, further comprising upon detecting the analog signal burst sub-carrier signals increasing receiver processing the presence of analog signal burst sub-carrier signals.

15. A method of controlling receiver processing in a communications receiver in response to an absence or presence of analog signal bursts containing packet data on a communications channel, comprising:
   monitoring the communications channel to detect a presence or an absence of the analog signal bursts; and
   reducing the receiver processing in the absence of analog signal bursts by disabling an echo canceler.

* * * * *